United States Patent
Choi et al.

(10) Patent No.: US 9,830,433 B2
(45) Date of Patent: Nov. 28, 2017

(54) METHOD, SYSTEM AND DEVICE FOR ENHANCING BUSINESS INFORMATION SECURITY

(71) Applicant: MarkAny Inc., Seoul (KR)

(72) Inventors: Jong-Uk Choi, Seoul (KR); Joo Won Cho, Seoul (KR); Yusep Rosmansyah, Bandung (ID)

(73) Assignee: MARKANY, INC., Seoul (KR)

(*) Notice: Subject to any disclaimer, the term of this patent is extended or adjusted under 35 U.S.C. 154(b) by 32 days.

(21) Appl. No.: 14/916,980

(22) PCT Filed: Jul. 24, 2014

(86) PCT No.: PCT/KR2014/006757
§ 371 (c)(1),
(2) Date: Mar. 4, 2016

(87) PCT Pub. No.: WO2015/034175
PCT Pub. Date: Mar. 12, 2015

(65) Prior Publication Data
US 2016/0217276 A1    Jul. 28, 2016

(30) Foreign Application Priority Data
Sep. 4, 2013 (KR) .................. 10-2013-0106169

(51) Int. Cl.
*H04L 29/06* (2006.01)
*G06F 21/16* (2013.01)
(Continued)

(52) U.S. Cl.
CPC .............. *G06F 21/16* (2013.01); *G06F 21/10* (2013.01); *G06F 21/6218* (2013.01);
(Continued)

(58) Field of Classification Search
CPC ....... G06F 21/6218; G06F 21/62; G06F 21/60
See application file for complete search history.

(56) References Cited

U.S. PATENT DOCUMENTS

| 2006/0193474 A1* | 8/2006 | Fransdonk | H04L 9/0825 |
|---|---|---|---|
| | | | 380/279 |
| 2009/0292930 A1* | 11/2009 | Marano | G06F 21/6218 |
| | | | 713/189 |
| 2013/0312107 A1* | 11/2013 | Agrawal | G06F 21/62 |
| | | | 726/26 |

FOREIGN PATENT DOCUMENTS

| KR | 10-2004-0102125 A | 12/2004 |
|---|---|---|
| KR | 20080024957 A | 3/2008 |

(Continued)

OTHER PUBLICATIONS

Korean International Searching Authority—International Search Report dated Oct. 30, 2014.
(Continued)

*Primary Examiner* — Jason K Gee
(74) *Attorney, Agent, or Firm* — Arent Fox LLP

(57) ABSTRACT

The present invention provides a method for creating an electronic document file comprising monitoring creation and changes of an electronic document file, receiving a policy file including document level set-up information and security policy, searching for words associated with business information from the text data retrieved from the electronic document file, computing an exposure score of the electronic document file based on the number of times for words associated with business information being searched and document level set-up information, assigning a document level to the electronic document file based on the exposure score, and inserting a watermark to text of the electronic document file to be displayed on the client device based on the user's personal information received from the server.

(Continued)

Accordingly, leakage of business documents for electronic document files including business information can be prevented by providing pre-security and post-security measures stronger than conventional measures.

7 Claims, 10 Drawing Sheets

(51) Int. Cl.
*G06F 21/10* (2013.01)
*G06F 21/62* (2013.01)

(52) U.S. Cl.
CPC .. *H04L 63/0428* (2013.01); *G06F 2221/0737* (2013.01); *G06F 2221/2101* (2013.01)

(56) References Cited

FOREIGN PATENT DOCUMENTS

| | | |
|---|---|---|
| KR | 100841274 B1 | 6/2008 |
| KR | 20090059694 A | 6/2009 |

OTHER PUBLICATIONS

Written Opinion of Korean International Searching Authority—dated Oct. 30, 2014.

* cited by examiner

| Importance | Word |
|---|---|
| 1 | "year entering the company" … |
| 2 | |
| 3 | . . . . . . . . . . . . . . . |
| 4 | . . . . . . . . . . . . . . . . . . . . . |
| 5 | "ID number of executives and staff" . . . . |

FIG. 6A

| User Level | Position |
|---|---|
| 1 | executives |
| 2 | team or deputy head |
| 3 | section chief |
| 4 | assistant chief |
| 5 | plain employee |

FIG. 6B

| Exposure Score | Level | (ACL) Accessibility |
|---|---|---|
| 20 or more | 1 | User Level 1 or below : read(0), save(0), print(0), edit(0)<br>User Level 2 : read(X), save(X), print(X), edit(X)<br>User Level 3 : read(X), save(X), print(X), edit(X)<br>User Level 4 : read(X), save(X), print(X), edit(X)<br>User Level 5 : read(X), save(X), print(X), edit(X) |
| 15~19 | 2 | User Level 2 or below : read(0), save(0), print(0), edit(0)<br>User Level 3 : read(0), save(X), print(0), edit(X)<br>User Level 4 : read(0), save(X), print(X), edit(X)<br>User Level 5 : read(X), save(X), print(X), edit(X) |
| 10~14 | 3 | User Level 3 or below : read(0), save(0), print(0), edit(0)<br>User Level 4 : read(0), save(X), print(0), edit(0)<br>User Level 5 : read(0), save(X), print(0), edit(X) |
| 6~9 | 4 | User Level 4 or below : read(0), save(0), print(0), edit(0)<br>User Level 5 : read(0), save(X), print(0), edit(0) |
| 0~5 | 5 | User Level 5 or below : read(0), save(0), print(0), edit(0) |

FIG. 6C

| | |
|---|---|
| MarkAny uses world-class | 12 - 1 = 11 pt. |
| technology to maintain its | 12 - 0 = 12 pt. |
| position as the world's | 12 - 0 = 12 pt. |
| leading company in digital | 12 - 1 = 11 pt. |
| Rights management and ... | 12 - 1 = 11 pt. |

FIG. 9A  FIG. 9B

| |
|---|
| Incorporated....company.... internal process |
| Mark's ID no. 800101-1111111... |
| ...social security no... |
| year of entering the company... |
| plain employee... chief... executive... |
| ....task... management... marketing... |

FIG. 9C

| |
|---|
| Incorporated ¹ ....company.... internal process ⁰ ⁰ |
| Mark's ID no. 800101-1111111... |
| ...social security no... |
| year of entering the company... |
| plain employee... chief... executive... |
| ...task... management... marketing... |
| ¹ ¹ |

FIG. 9D

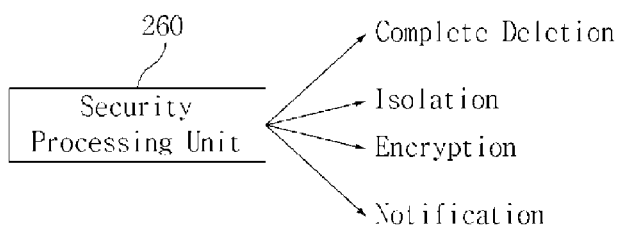

FIG. 10

METHOD, SYSTEM AND DEVICE FOR ENHANCING BUSINESS INFORMATION SECURITY

CROSS-REFERENCE TO RELATED APPLICATIONS

This application is 371 of International Application No. PCT/KR2014/6757 entitled "METHOD, SYSTEM AND APPARATUS FOR ENHANCING SECURITY OF INTERNAL INFORMATION OF BUSINESS," filed Jul. 24, 2014, which claims priority to Korean Application No. 10-2013-0106169 filed Sep. 4, 2013, the contents of each of the aforementioned applications are incorporated by reference as if fully set forth herein.

TECHNICAL FIELD

The present invention relates to a method, system and device for enhancing business information security. More particularly, the present invention relates to a method for creating an electronic document file with enhanced business information security on a client device, a client device thereof, and a system comprising the same, in order to prevent leakage of business information.

BACKGROUND ART

The contemporary society entered a new information-oriented society as a result of constant technical innovation and scientific development, and accordingly, smart work expanded not only to the government and private enterprises of developed countries but also to those of developing countries, and most documents are being managed and sent electronically. Although a business system through electronic documents provides convenience to use, unfortunately, there are also losses caused by the leakage of business information by a third party. In particular, due to hacking techniques that are getting more are more advanced, business information of government agencies and private enterprises can leak out, which may determine the life and death of an organization.

Thus, a protection means is essentially required to prevent the leakage of business information. In order to protect business secrets and prevent the leakage of important business information, conventionally, DRM (Digital Right Management) or DLP (Data Loss Prevention) solution was mainly used as a business security system.

The patent application entitled "Methods for Digital Rights Management" (Korean Patent Laid-Open No. 2008-0064164) of Intertrust Technologies Corporation discloses a method and system relating to a digital rights management engine, which evaluates the license associated with the protected content and determines whether the requested access to the content or other accessibility is authorized. In order to manage digital rights, first, the contents are packaged, and the document is encrypted by attaching a license for controlling the user's access to the corresponding content. If an encrypted document is delivered to the corresponding user, the user can access the document within the accessibility assigned to him/her by decrypting the document. That is, it is a method based on access control and encryption by encrypting and delivering a document and controlling access to a decrypted document according to the user's accessibility. However, the digital right management (DRM) method has a risk that a user who has accessibility to the document can easily access the content any time, and thus the content can be leaked.

The DLP method, which is another business security system, retrieves text by searching the document, determines the security level, and then takes the next measure. Symantec, which is a representative enterprise using the DLP method, states that "Symantec DLP 11 is the only solution in the business which sufficiently satisfies all aspects of discovering (searching for secret documents and personal information), monitoring (tracking use/accessibility), and protecting (taking measures for accident), which are the core functions of the data leakage prevention solution" and that "through more enhanced functions, it can reduce the risk of important data which may affect the business of enterprises being leaked on purpose or by mistake" [IT Daily, 2011]. However, the DLP method which detects leakage of content through search delivers the document in clear text, and thus when the document is leaked, there is a problem that additional clear text can also be leaked. Also, there is a problem that it is weak to hacking from outside because it depends on a search technology based on clear text.

The conventional DRM and DLP methods, which were representatively used for business security, have the above mentioned problems. Also, due to digitalization, the amount of data is increasing, and in particular, according to highly enhanced attacks such as APT, recently there are many cases where information is taken away through encrypting or forging techniques, and thus it has become difficult to prevent leakage of information with the conventional business security system.

In addition, as another phenomenon in the current IT industry, through changes of various equipments, the conventional computer system is now introducing various micro devices after going through mobile equipments such as smart phone and tablet PC, etc. In addition to the representative i Watch of Apple, and Google Glasses of Google, various micro devices are entering the market including micro cameras, recorders, etc. Thus, as it has become easier to have information leaked by a third party, it is essentially required to prevent leakage of information through the owner's copyright and prevention of illegal copying by inserting a watermark to the content. Also, due to various changes in equipment and change in business environment, the subject of hacking is no longer limited only to the server, but hacking may occur in personal equipments. Thus, security based on user equipment is required.

PRIOR ART REFERENCE

Patent Reference (Patent Reference 1) Korean Patent Laid-Open No. 2008-0064164 (Laid-Open Date: Jul. 8, 2008)

DETAILED DESCRIPTION OF THE INVENTION

Technical Problem

In order to solve the above problem, it is an object of the present invention to provide a method, device and system for enhancing business information security, which supplements the weak points of the security system by integrating the DRM method based on accessibility control by encrypting the digital document and assigning differentiation to the range of use of the digital document for each user, and the data check method of the DLP method based on search.

Also, when integrating the DRM function and DLP function, the existing systems are not simply combined, but document level is set up based on the exposure score computing the degree of exposure of business information by the search function of DLP, and the document is encrypted and goes through security processing by DRM, and thus it is possible to control accessibility for each user. In addition, a watermark function assigning non-visual differentiation is provided on a screen displayed to each user based on the searched data. By the method and device of inserting watermark, the person who leaked information can be easily determined when a digital document is leaked by a third party. Thus, it is another object of the present invention to provide a method, device and system for inserting/detecting watermark together as a basic module to enhance post-security measures of the company, which are highlighted as various micro devices are being developed.

It is yet another object of the present invention to enhance security in mobile business environment by various equipments and smart equipments by establishing a user device based security system. The present invention provides a pre-security measure by searching for documents and setting up levels at the user terminal itself, not the security system in the existing server, and a post-security measure by inserting text watermark. Thus, it is yet another object of the present invention to provide an efficient security system in the flow of change to a mobile business environment.

Meanwhile, the subject matter to be solved in the present invention is not limited to the above, and can be variously extended within a range that does not deviate from the idea and scope of the present invention.

Technical Solution

In order to achieve an object of the present invention, the method for creating an electronic document file on a client device to enhance business information security according to the embodiments of the present invention may comprise monitoring creation of an electronic document file on a client device and changes on the electronic document file, receiving a policy file from a server, retrieving a text data from the electronic document file, searching for words associated with business information from the retrieved text data, computing an exposure score for the electronic document file based on the number of times for words associated with business information being searched and the document level set-up information, assigning a document level to the electronic document file based on the exposure score, receiving user's personal information of the client device from the server and inserting a watermark to text of the electronic document file to be displayed on the client device based on the received user's personal information, based on the assigned document level to the electronic document file, performing a security processing according to the security policy, the security processing including one of deletion, isolation, encryption and notification, and creating a protected electronic document file by inserting an accessibility information into a header of the electronic document file.

According to an embodiment, policy file may include regular expressions, keywords, security policy and document level set-up information. Document level set-up information may include importance of words associated with business information, document level policy and user accessibility policy which defines user's accessibility to a document according to a document level.

According to an embodiment, exposure score can be computed by the sum of multiplying the number of times for words associated with business information being searched and the importance on words.

According to an embodiment, the inserting the watermark comprises varying at least one of a font size and a font width of the text according to the user's personal information.

According to an embodiment, the method further comprising downloading the electronic document file from the server to the client device, the downloading the electronic document file comprising at the server, verifying a user login of the client device, referring to an organization chart and the user's personal information from a personnel database in the server, referring to the policy file including the document level set-up information and the security policy from a policy database in the server, assigning the document level associated with the user accessibility to the electronic document file based on the document level set-up information and inserting the watermark to the electronic document file based on the user's personal information, encrypting the electronic document file after the assigning the document level and the inserting the watermark, and sending the encrypted electronic document file from the server to the client device.

The system for enhancing business information security according to other embodiments of the present invention may comprise a server device comprising a server policy unit connected to a policy database and a security management unit connected to a personnel database, and a client device connected to the server device via network, the client device comprising a monitoring unit configured to monitor creation of an electronic document file and changes on the electronic document file, a control unit configured to receive a policy file from the policy database in the server device, and a document security unit, the document unit comprising a search unit configured to retrieve a text data from the electronic document file and search for words associated with business information from the retrieved text data, a level determination unit configured to compute an exposure score for the electronic document file based on the number of times for words associated with business information being searched and the document level set-up information and assign a document level associated with user accessibility to the electronic document file based on the exposure score, a watermark insertion unit configured to insert a watermark to text of the electronic document file to be displayed on the client device based on a user's personal information received from the server device, a security processing unit configured to perform a security processing to the electronic document according to the security policy based on the assigned document level, the security processing including one of deletion, isolation, encryption and notification, and a file creation unit configured to create a protected electronic document file by inserting an accessibility information into a header of the electronic document file.

According to an embodiment, policy file may include regular expressions, keywords, security policy and document level set-up information. Document level set-up information may include importance of words associated with business information, document level policy and user accessibility policy which defines user's accessibility to a document according to a document level.

According to an embodiment, exposure score can be computed by the sum of multiplying the number of times for words associated with business information being searched and the importance on words.

According to an embodiment, the watermark insertion unit may be configured to vary at least one of a font size and a font width of the text according to the user's personal information.

According to an embodiment, the server device is configured to verify a user login of the client device, refer to an organization chart and the user's personal information from the personnel database, refer to the policy file including the security policy and the document level set-up information from the policy database, assign the document level associated with the user accessibility to the electronic document file based on the document level set-up information and insert the watermark to the electronic document file based on the user's personal information, and encrypt the electronic document file after the assigning the document level and the inserting the watermark, and the client device further comprises a document holding unit configured to download the encrypted electronic document file from the server device.

The client device for creating an electronic document file to enhance business information security according to other embodiments of the present invention may comprise means for monitoring creation of an electronic document file and changes on the electronic document file, means for receiving a policy file from a server, means for retrieving a text data from the electronic document file, means for searching for words associated with business information from the retrieved text data, means for computing an exposure score for the electronic document file based on the number of times for words associated with business information being searched and the document level set-up information, means for assigning a document level to the electronic document file based on the exposure score, means for receiving user's personal information of the client device from the server and inserting a watermark to text of the electronic document file to be displayed on the client device based on the received user's personal information, means for performing a security processing according to the security policy based on the assigned document level, the security processing including one of deletion, isolation, encryption and notification, and creating a protected electronic document file by inserting an accessibility information into a header of the electronic document file.

According to an embodiment, policy file may include regular expressions, keywords, security policy and document level set-up information. Document level set-up information may include importance of words associated with business information, document level policy and user accessibility policy which defines user's accessibility to a document according to a document level.

According to an embodiment, exposure score can be computed by the sum of multiplying the number of times for words associated with business information being searched and the importance on words.

Effect of the Invention

According to the method, device and system for enhancing business information security according to the embodiments of the present invention, it has become possible to control accessibility to a document for each user, and provide strong pre-security measures preventing the leakage of business information in advance by applying an appropriate security measure for each document, by searching whether an electronic document present in a company includes secret information of the company using a search technology for the electronic document, computing the exposure score based on the degree of exposure and determining the security level of the corresponding document, and controlling the user's accessibility to each security level of the document.

Also, it has become possible to track the leakage path when the document is leaked outside by the act of taking pictures, etc. by a third party, by inserting watermark to the document based on a specific value that can differentiate each user and providing differentiation to the document on the screen displayed for each user, and thus provide post-security measures to the company for the development of various micro devices.

Meanwhile, the effect of the present invention is not limited thereto, and can be variously extended within a range that does not deviate from the idea and scope of the present invention.

BRIEF DESCRIPTION OF DRAWINGS

FIGS. 6A-6C illustrate exemplary level set-up information used in the present invention.

FIGS. 9A-9D illustrate embodiments of inserting watermark by varying the font size and varying the font width.

FIG. 10 illustrates the function of a security processing unit according to an embodiment of the present invention.

BEST MODE FOR CARRYING OUT THE INVENTION

Figure 1:
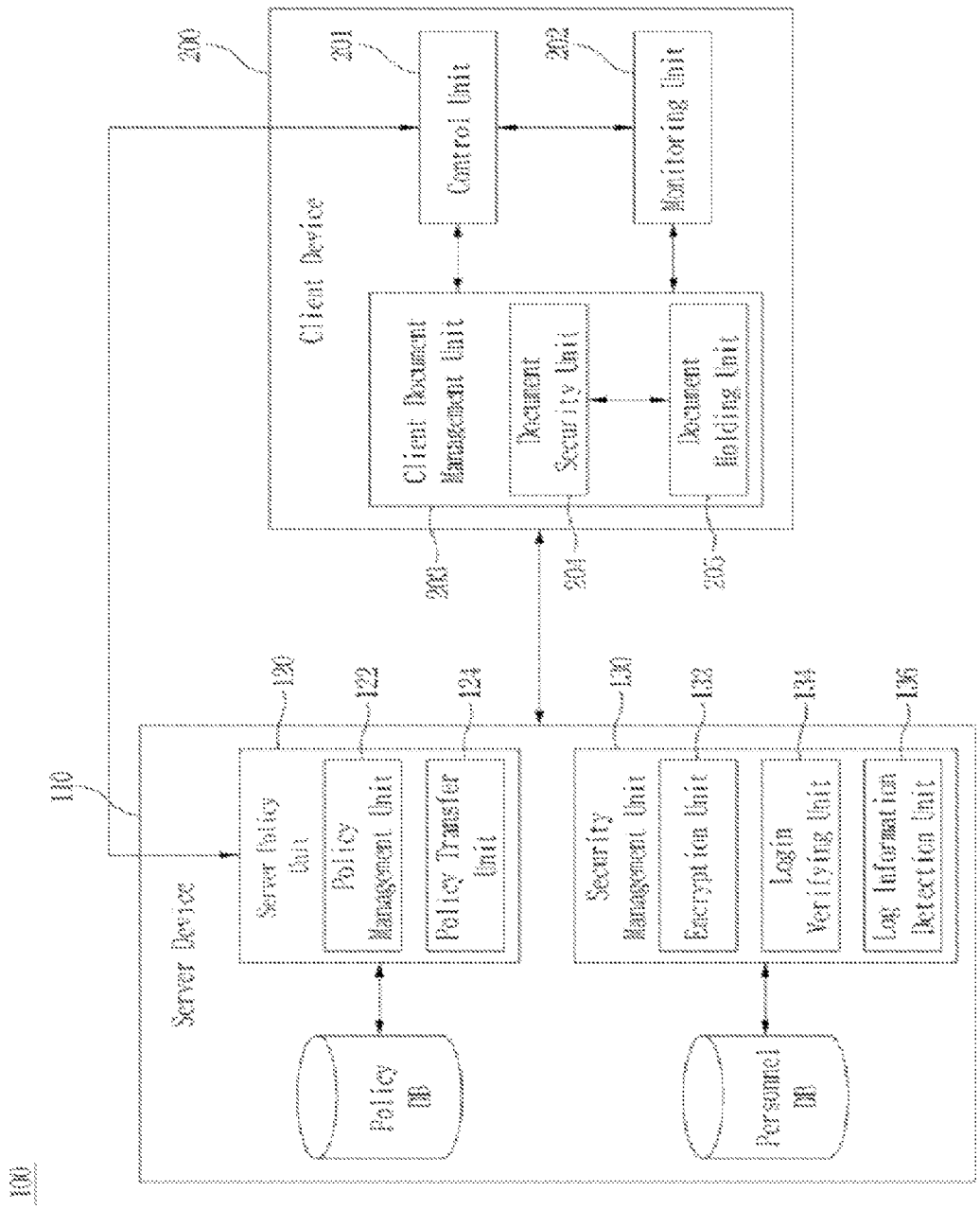
FIG. 1 illustrates a schematic diagram of a system for enhancing business information security comprising a server device and a client device.

With regard to the embodiments of the present invention disclosed in the detailed description, specific structural or functional explanations are exemplified only for the purpose of explaining the embodiments of the present invention. Also embodiments of the present invention can be carried out in various forms, and they shall not be interpreted to be limited to the embodiments explained in the detailed description.

Various modifications can be made to the present invention, and the present invention may have various forms. Thus, specific embodiments will be exemplified in the drawings and explained in detail in the detailed description.

However, they are not to limit the present invention to the specific forms disclosed, and should be understood to include all modification, equivalents or replacements included within the idea and technical scope of the present invention.

The terms used in the present invention are used simply to explain specific embodiments, and they do not intend to limit the present invention. The terms in singular form include terms in plural form unless they obviously mean something else from the context. The term "comprise" or "have," etc. in the present application are used to indicate that the explained features, numbers, steps, operations, constitutional elements, components or combinations thereof are present, and should not be understood as excluding a possibility of the presence or addition of one or more features, numbers, steps, operations, constitutional elements, components or combinations thereof.

Unless defined otherwise, all terms used here including technical or scientific terms have the same meanings as those generally understood by a person having ordinary skill in the art to which the present invention pertains. Terms such as those defined in the generally used dictionary should be interpreted to have meanings consistent with those in the context of the relevant technology, and should not be interpreted ideally or excessively formally unless obviously defined otherwise in the present invention.

Hereinafter, preferable embodiments of the present invention are explained in more detail with reference to the attached drawings. Same reference numerals are used for the same constitutional elements in the drawings, and repeated explanation on the same constitutional element is omitted.

FIG. 1 is a schematic diagram of a system for enhancing business information security. As illustrated in FIG. 1, in order to prevent leakage of business information according to an embodiment of the present invention, the system (100) for creating an electronic document file with enhanced business information security comprises a server device (110) and a client device (200). The server device (110) may comprise a server policy unit (120) and a security management unit (130). The client device (200) may comprise a control unit (201), a monitoring unit (202), and a client document management unit (203).

The server device (110) in the system (100) for creating an electronic document file with enhanced business information security may comprise a server policy unit (120) and security management unit (130). The server policy unit (120) plays the role of managing policies for protecting business information and supporting them to clients. The server policy unit (120) may comprise a policy management unit (122) and a policy transfer unit (124). The policy management unit (122) stores and manages policies, etc. for setting up document level and user accessibility level according to the exposure score on the business information of the corresponding document. The policy transfer unit (124) plays the role of transferring the corresponding policy file to the client. The security management unit (130) plays the role of verifying a user login, detecting log information, and supporting encryption of the document. More particularly, it may comprise a login verifying unit (134) verifying login accessibility for each user based on user information and organization chart from a personnel database when the user logs in to the server, a log information detection unit (136) receiving and managing information associated with detection of business information at the client's end and security processing according to the detection result, and an encryption unit (132) encrypting the document and delivering it to the client.

The client device (200) in the system (100) for creating an electronic document file with enhanced business information security may comprise a control unit (201) receiving a policy file from the server and instructing search of an electronic document file, a monitoring unit (202) informing the change of a process or a file through user PC inspection, and a client document management unit (203) managing the document at the client's end. Also, the client document management unit (203) may comprise a document security unit (204) in charge of the security of the document and a document holding unit (205) in charge of uploading and back up of the document.

Figure 2:
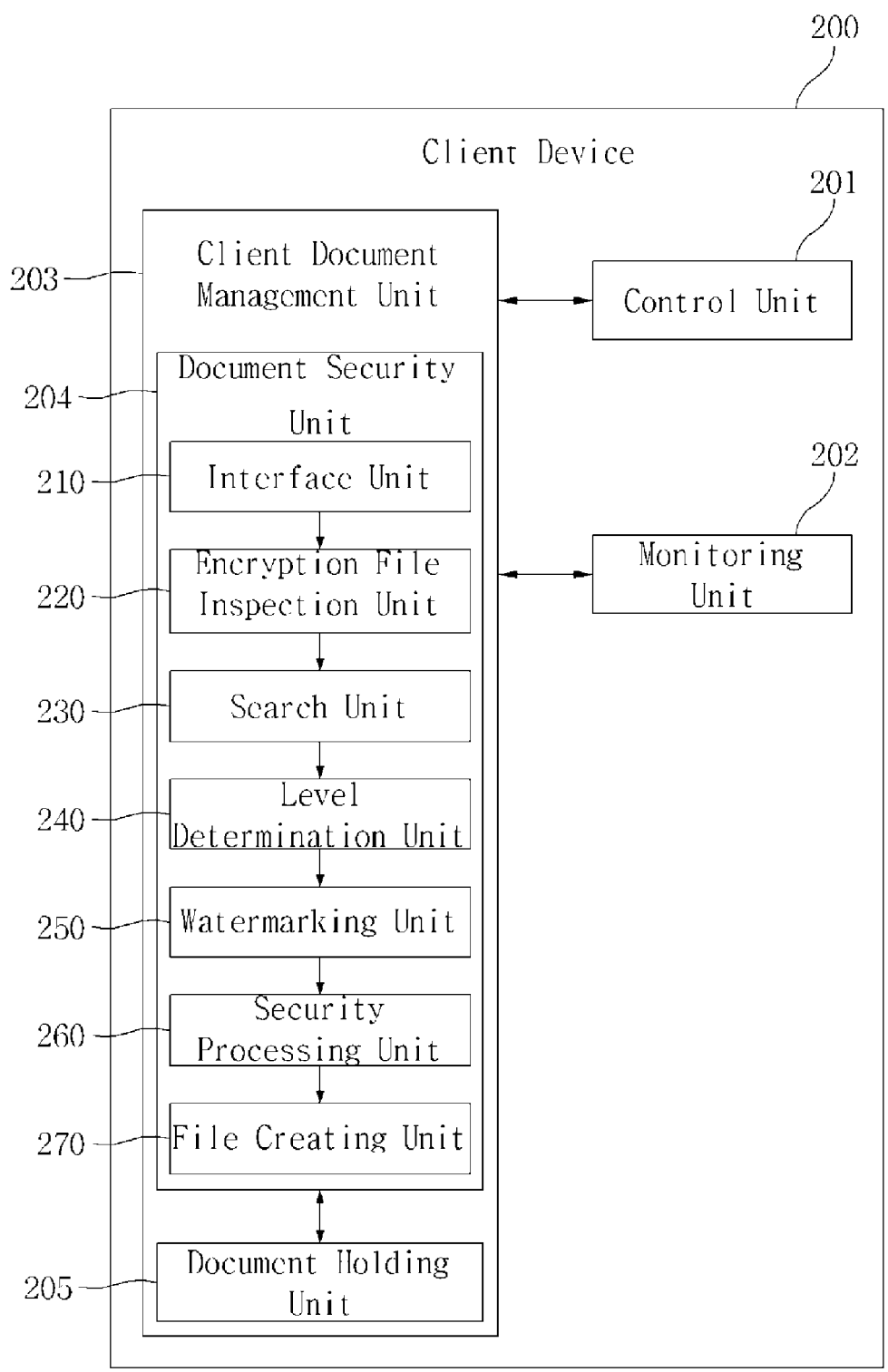
FIG. 2 illustrates a client device according to an embodiment of the present invention.
Figure 12:
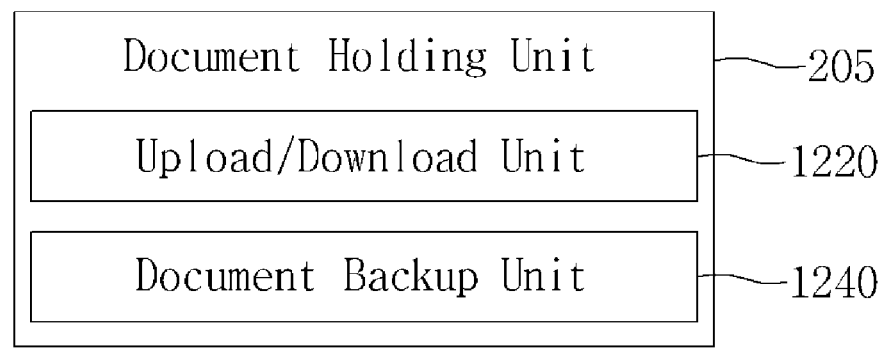
FIG. 12 illustrates a document holding unit according to an embodiment of the present invention.

FIG. 2 illustrates the client device (200) according to an embodiment of the present invention in more detail. The client device (200) may comprise a control unit (201), a monitoring unit (202), and a client document management unit (203). The client document management unit (203) may comprise a document security unit (204) and a document holding unit (205). Detailed features of the document holding unit (205) are illustrated in FIG. 12. Referring to the document security unit (204) of the client document management unit (203) in more detail, the document security unit may comprise an interface unit (210), encryption/non-encryption file inspection unit (220), search unit (230), level determination unit (240), watermarking unit (250), security processing unit (260) and file creating unit (270).

Figure 7:
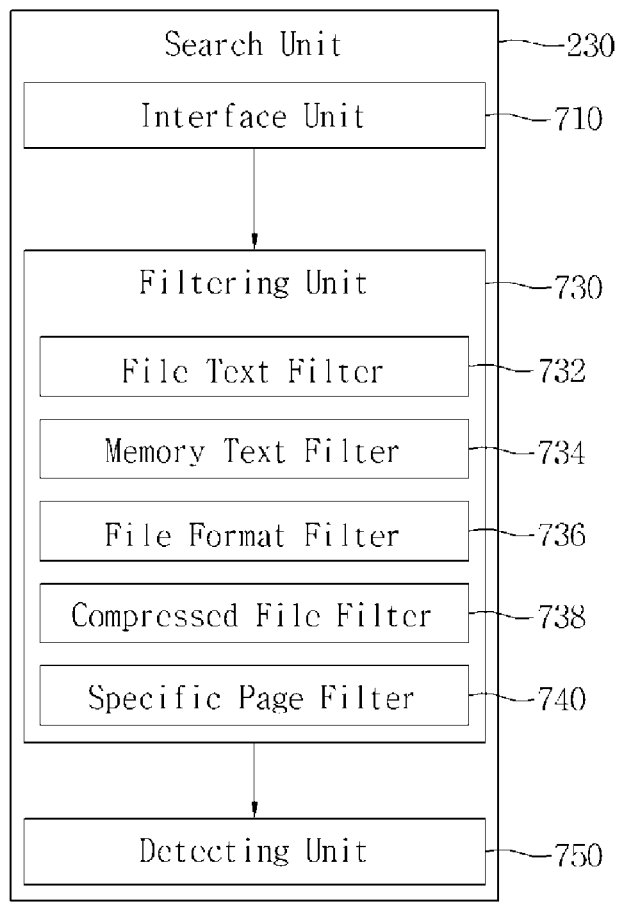
FIG. 7 illustrates a search unit according to an embodiment of the present invention.
Figure 8:
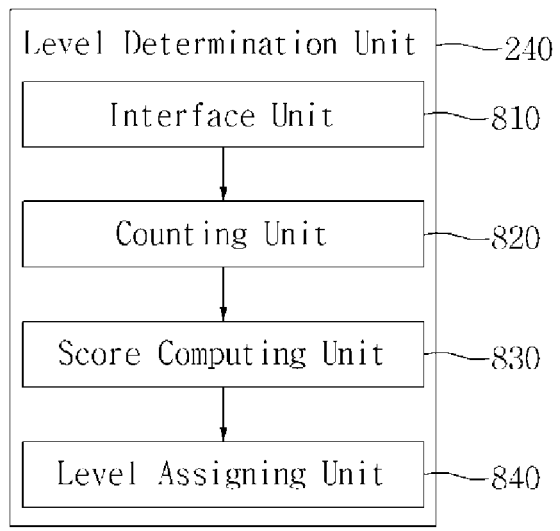
FIG. 8 illustrates a level determination unit according to an embodiment of the present invention.

The interface unit (210) receives an alarm creating or changing the document by the monitoring unit (202), receives search instruction by the control unit (201), and receives the document downloaded from the server by the document holding unit (205). The electronic document file received at the interface unit (210) and downloaded from the server is delivered to the encryption/non-encryption file inspection unit (220) so as to determine whether the electronic document file was encrypted or not. If it is determined to be encrypted, it can be decrypted and stored in the memory temporarily. The non-encrypted electronic document file or decrypted electronic document file is delivered to the search unit (230) of the document security unit, to perform search on whether the document file includes business information. Detailed features of the search unit (230) are illustrated in FIG. 7. The level determination unit (240) determines the document level and the user's accessibility level based on the document text retrieved by the search unit (230) and the policy file received from the server. Detailed features on the level determination unit (240) are illustrated in FIG. 8. The document whose level has been determined receives user's personal information from the server at the watermarking unit (250), and text watermarks assigning a difference to the document displayed for each user are inserted based on the information. Then, security processing such as deletion, isolation, etc. is performed with respect to the electronic document file watermarked by the security processing unit (260), and a final file inserted with accessibility information of the file is created by the file creating unit (270).

Figure 3:
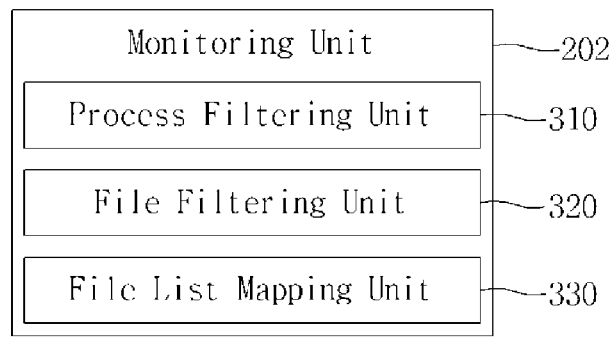
FIG. 3 illustrates a monitoring unit according to an embodiment of the present invention.

FIG. 3 illustrates the monitoring unit (202) of the client device (200) in FIG. 2 in more detail. The monitoring unit (202) may comprise a process filtering unit (310), a file filtering unit (320), and a file list mapping unit (330). The process filtering unit (310) plays the role of informing information of the process in case an electronic document file is created or modified during the document file process of a client device through real time observation on the electronic file process. The file filtering unit (320) performs real time observation on the file based on the file name and extension, etc., and in case change is detected on the file, it plays the role of informing the change. The file list mapping unit (330) manages the file list once inspected to exclude it from the next inspection, thus playing the role of improving the efficiency of the inspection.

Figure 4:
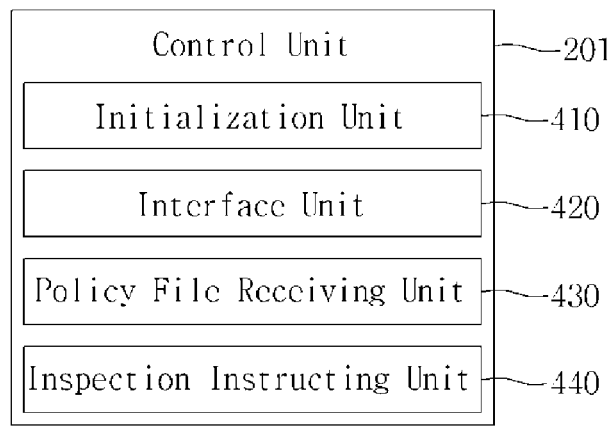
FIG. 4 illustrates a control unit according to an embodiment of the present invention.

FIG. 4 illustrates the control unit (201) of the client device (200) in FIG. 2 in more detail. The control unit (201) may comprise an initialization unit (410), an interface unit (420), a policy file receiving unit (430) and an inspection instructing unit (440). The initialization unit (410) provides the initialization function which turns the document security unit (204) of the client document management unit (203) back to its original state. The document security unit needs to be initiated by the initialization unit because its set up can change continuously due to periodic update or user's set-up change, etc. The interface unit (420) receives information provided from the initialization unit. The policy file receiving unit (430) receives policy file from the server, and may provide functions such as opening, closing the received policy file, reading, writing, deleting, etc., specific items from the policy file. The inspection instructing unit (440) plays the role of having the document security unit perform file inspection on the document file loaded to the client.

Figure 5:
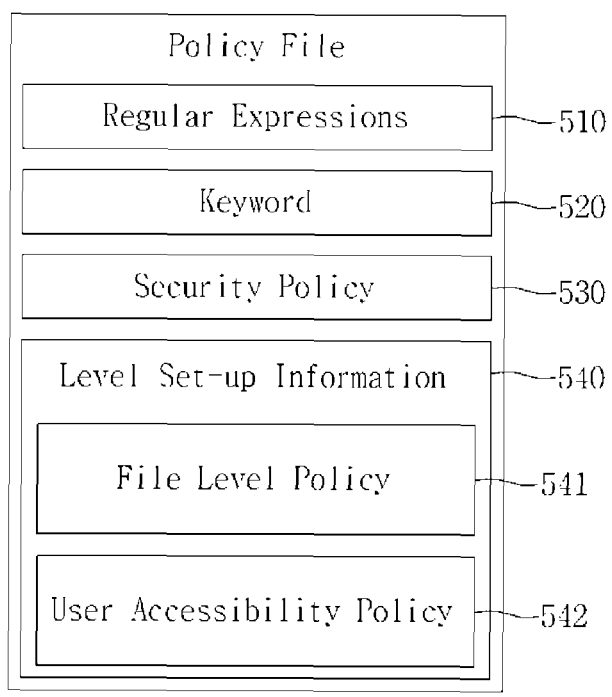
FIG. 5 illustrates a policy file according to an embodiment of the present invention.

FIG. 5 illustrates a policy file managed at the server device, and received from the service device to the client device according to an embodiment of the present invention. The policy file (500) includes regular expressions (510), keywords (520), security policy (530) and level set-up information (540). According to an embodiment of the present invention, the policy file (500) can be periodically updated by the server device.

Regular expressions (510) express all information which can be understood by identifying or inferring business information in regular expressions. Regular expressions are supported for search and substitution of letter rows in many text editors and programming languages. The keywords (520) provide words associated with business information. For example, keywords may include words such as secret, protect, limited publication, first level secret, second level secret, foreign secret, etc.

Security policy (530) means internally summarizing in advance which measure of security is to be applied depending on the document level. Level set-up information (540) may comprise file level policy (541) and user accessibility policy (542). Level set-up information (540) may comprise importance information summarizing each word associated with business information to set up a level of business related documents, and information associated with setting up the level of business information such as information on reading period, etc. for each level of document.

FIGS. 6A-6C illustrate exemplary policy files that can be used in the present invention. FIG. 6A represents importance information for each word associated with business information. For example, the word "year entering the company" has an importance of 1 point, and the word "ID number of executives and staff" has an importance of 5 points.

FIG. 6B illustrates the user level of a business document according to the position in the company. For example, a client user whose position is a plain employee has a user level of '5,' an assistant chief has a user level of '4,' a section chief has a user level of '3,' a head of a team or deputy head of department has a user level of '2,' and executives have a user level of '1.' In general, the higher the user level, the more accessibility to the document.

FIG. 7 illustrates the search unit (230) which may be included in the document security unit of a client device in accordance with an embodiment of the present invention in more detail. The search unit (230) may comprise an interface unit (710), a filtering unit (730) and a detecting unit (750). The interface unit (710) receives document inspection instruction from the inspection instructing unit (440) of the control unit (201), and receives non-encrypted or decrypted electronic document files subject to inspection from the encryption/non-encryption file inspection unit (220) of the document security unit (204).

The filtering unit (730) is configured of a plurality of filters performing the function of retrieving only text regarding a specific electronic document in order to retrieve text information included in various electronic documents. The filtering unit (730) performs document format detection, document error verification, document information retrieval, text retrieval. More particularly, the filtering unit (730) may comprise a file text filter (732), a memory text filter (734), a file format filter (736), a compressed file filter (738), and a specific page filter (740).

The file text filter (732) performs the function of passing pass information of a specific file and retrieving the text of the corresponding file. The memory text filter (734) performs the function of passing address information of a specific memory stored with data and retrieving text of the corresponding memory. The file format filter (736) performs the function of inspecting whether the extension of the corresponding file that will perform search was forged or not. The compressed file filter (738) can retrieve only the file information (file name, format information, etc.) within the corresponding compressed file or allow only a specific file to be filtered in case the inspected file is a compressed file. The specific page filter (740) provides the function of filtering text information for only a specific page among the entire files.

The text information retrieved through the filtering unit (730) is provided to the detecting unit (750). By comparing the text information retrieved with the regular expressions and keywords for business information included in the policy file received from the server, the detecting unit (750) detects whether the corresponding document file includes words associated with business information. The detecting unit (750) can load policy file including regular expressions and keywords from the policy file receiving unit (430) of the control unit (201) and store the loaded policy file in a separate memory.

FIG. 8 illustrates a level determination unit (240) which may be included in the document security unit of a client device according to an embodiment of the present invention in more detail. The level determination unit (240) may comprise an interface unit (810), a counting unit (820), a score computing unit (830) and a level assigning unit (840).

The interface unit (810) receives text information detection results from the detecting unit (750) of a search unit (230) together with the instruction to initiate level determination. The counting unit (820) plays the role of counting the number of times words associated with business information retrieved by the detecting unit are detected. Also, the score computing unit (830) computes the exposure score of business information by using the equation "total of (number of times the word is detected×importance for each business information)=exposure score." For example, assuming that the word "ID number" was detected from the text twice, and the word "year entering the company" was detected once, referring to the importance of each word illustrated in FIG. 6A, it can be understood that "ID number" has importance 5, and "year entering the company" has importance 1. Thus, in this case, by the above equation, the exposure score of the corresponding document is computed as 5×2 (importance of "ID number"×number of times detected)+1×1 (importance of "year entering the company"×number of times detected)=11, i.e., 11 points.

The level assigning unit (840) plays the role of assigning document level so as to control access to each document for each user according to the level set-up information included in the policy file based on the exposure score computed in the score computing unit. In this regard, FIG. 6C illustrates an embodiment of the document level set-up policy assigning levels according to exposure score. According to the embodiment, for example, if the computed exposure score is 0~5 points, the document is assigned with level 5. If the exposure score is 6~9points, level 4 is assigned. If the exposure score is 10~14 points, level 3 is assigned. If the exposure score is 15~19 points, level 2 is assigned. If the exposure score is 20 points or above, level 1 is assigned. As mentioned above, the policy file received from the server comprises user accessibility policy. Referring to the user accessibility policy for each document level illustrated in FIG. 6C in more detail, for example, if the document level is assigned with level 1 and the user level of the user of the client device is level 1 or above, the user can read, save, print and edit the document. According to the embodiment, with regard to documents whose document level is level 1, a user who does not have a user level of level 1 cannot read, save, print or edit the document. Also, according to the embodiment, with regard to documents whose user document level is level 2, a user whose user level is level 2 or above can read, save, print, edit and edit the document. According to the embodiment, with regard to documents whose document level is level 1, a user who does not have a user level of level 1 cannot read, save, print or edit the document. Also, according to the embodiment, with regard to documents whose user document level is level 2, a user whose user level is level 2 or above can read, save, print, edit the document. If the user level is level 3, the user can read and print the document, but cannot save and edit it. If the user level is level 4, the user can only read the document. If the user level is level 5, the user cannot read, save, output nor edit the document. The user accessibility for each level can be changed at any time according to the business security policy and can be updated at the server.

FIGS. 9A-D illustrate exemplary methods of inserting a watermark to a text document at the watermarking unit which may be included in the document policy unit of a client device according to an embodiment of the present invention. FIGS. 9A and 9B illustrate a method of inserting a watermark by reducing the font size of a specific text. FIG. 9A illustrates the text subject to insertion of watermarking. It is assumed that the document has a basic font size of 12 pt, and the user of the document has a user key of "10011." In the embodiment, each text line in the text area illustrated in FIG. 9A may correspond to each bit value of the user key, in order. Accordingly, the first row in the text area corresponds to the first bit of the user key, "1." The second row in the text area corresponds to the second bit of the user key, "0." The third row in the text area corresponds to the third bit of the user key, "0." The fourth row in the text area corresponds to the fourth bit of the user key, "1." The fifth row in the text area corresponds to the fifth bit of the user key, "1." If so, the watermarking unit (250) may reduce or enlarge the font size of the text included in each text line as much as the size set up. For example, the texts assigned with bit "1" may reduce by 1 pt. To be specific, as illustrated in FIG. 9B, the text in the first, fourth and fifth rows of the text area which correspond to bit "1" can be controlled to have font size 11 pt where 1 pt is reduced when compared with the basic font size. At this time, the font size of the second and third rows in the text area which correspond to bit "0" would be maintained to 12 pt. If the key bit number of the user is fixed to 5 bits, the key value of the user is repeatedly applied from the first row of the text by every five rows. Thus, the interval between the text line will be adjusted to 5 rows, and in this case, it would be easier to detect watermark in the future. Meanwhile, the text size may be reduced or enlarged to bit value "1" or "0," respectively, but in order to prevent the problem of system overflow, the method reducing font size is generally preferred.

Next, FIGS. 9C and 9D illustrate the method of inserting a watermark in a method of varying the font width of a specific text. Accordingly, FIG. 9C illustrates the text subject to insertion of watermarking. According to an embodiment of the present invention, the consonants or vowels most frequently used are detected from the text, and the bits of the user key are repeatedly corresponded to the texts including the consonants or vowels, in order. By changing the changing the outline of the text, the font width is varied to be thinner or thicker. The font outline varying the font width according to the user key as above can be performed with respect to the entire text area. For example, as illustrated in FIG. 9D, assuming that the user key is "10011" and the most frequently detected consonant is "e," 1, 0, 0, 1 and 1 can correspond to words including the consonant "e," in the order, and the font width of the text corresponding to bit "1" can be varied to be thinner or thicker. In case the document screen is leaked by printing or taking pictures, etc. by a third party, the document inserted with watermark by such method can re-track the user key value only with the font width. Thus, it is easier to track the leakage path, and accordingly post-security is reinforced.

FIG. 10 illustrates the processes performed at the security processing unit (260) which may be included in the document security unit of a client device according to an embodiment of the present invention. The security processing unit (260) may perform a security processing according to the security policy for each level set up for the policy file according to the document level determined at the document determination unit (240), the security processing including one of complete deletion, isolation, encryption and notification. In case of complete deletion processing, the document may not be restored, and in case of isolation processing, access without authorization can be made impossible by moving the document to a specific place. For example, as a result of downloading a document from the server and revising it by the user, when searching for the corresponding document, if words having an importance of level 5 or above are exposed at least 9 times, complete deletion processing may be performed, and if words having an importance of level 5 or above are exposed at least 6 times, isolation processing may be performed. Also, although words having an importance of level 5 or above are not included at least 6 times, if the exposure score is computed to 3 points or above and 30 points or below, the corresponding document is encrypted and uploaded to the server, and then can be managed and saved by the server. If the exposure score is point 2 or below, changes on the corresponding document are recorded as a log, and may be notified.

Figure 11:
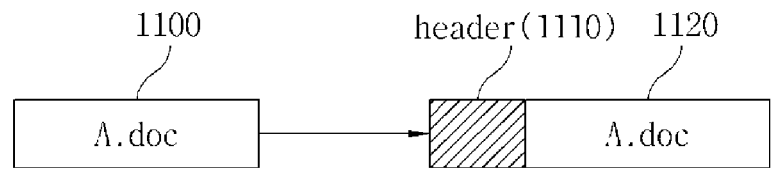
FIG. 11 illustrates an embodiment of creating a file including a header.

FIG. 11 is a drawing for explaining the structure of a file created in the file creating unit (270) which may be included in the document security unit of a client device according to an embodiment of the present invention. The file creating unit (270) may create security to the header (1110) of the file in the body unit (1100) of an encrypted document, i.e., create an encrypted file (1120) inserted with information associated with user accessibility.

FIG. 12 illustrates the document holding unit (205) of the client device according to an embodiment of the present invention. The document holding unit (205) may comprise an upload/download unit (1220) uploading the document to the server and downloading it to the client, and a document backup unit (1240) in charge of back up of the document when creating the document.

Figure 13A:
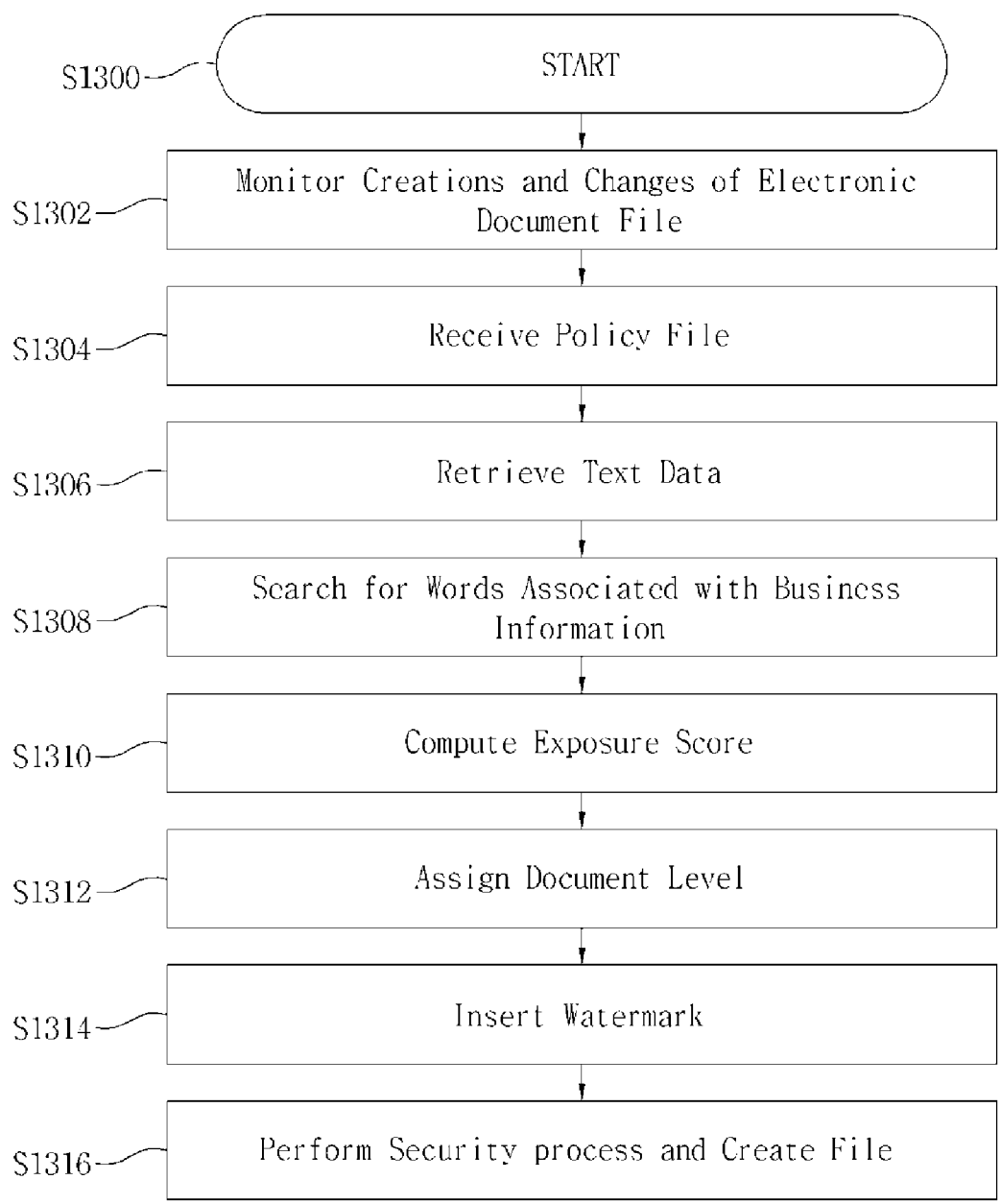
FIG. 13A illustrates a flow chart of a method for creating an electronic document file on a client device to enhance business information security according to an embodiment of the present invention.

FIG. 13A is a flow chart of the method for creating an electronic document file on the client device to enhance business information security according to an embodiment of the present invention. The client device initiates the process as an electronic document file is downloaded or created (step S1300). The monitoring unit of the client device monitors creation of electronic document file on the client device and/or changes on the electronic document file downloaded from the server (step S1302). The client device may receive policy file from the server (step S1304). As illustrated in FIG. 5, the policy file may include regular expressions, keywords, security policy and document level set-up information. Document level set-up information may include importance of words associated with business information, document level policy and user accessibility policy which defines user's accessibility to a document according to the document level based on exposure score. Receiving policy file from the server can be performed not only when creation and/or change of electronic document file is monitored at the client device, but can also be performed periodically without relation to this.

The client device may retrieve text data from the electronic document file monitored through the filtering unit of the search unit (step S1306), and may search for words associated with business information from the text data retrieved through the detecting unit of the search unit (step S1308). The counting unit in the level determination unit of the client device may count the number of times the words associated with business information is detected, and the score computing unit computes the exposure score for the electronic document file by computing the sum of multiplying the number of times for words associated with business information being searched and the importance on words associated with business information with reference to the importance of the words associated with business information among the document level set-up information included in the policy file (step S1310).

The level assigning unit in the client device assigns document level associated with user accessibility to electronic document file based on the user accessibility policy included in the policy file according to the exposure score computed as above (step S1312). The watermarking unit in the client device receives user's personal information on the user of the client device from the server, and inserts a watermark to the text of the electronic document file displayed on the client device based on the received user's personal information (step S1314). Inserting a watermark may comprise at least one of varying font size of the text and varying font width of the text according to the user's personal information.

Thereafter, with regard to an electronic document file whose security level is determined and watermark is inserted, the security processing unit of the client device may perform a security process according to the security policy for each level, the security policy including one of deletion, isolation, encryption and notification of the corresponding document, and the file creating unit may create a file including a header inserted with security associated information (step S1316).

Figure 13B:
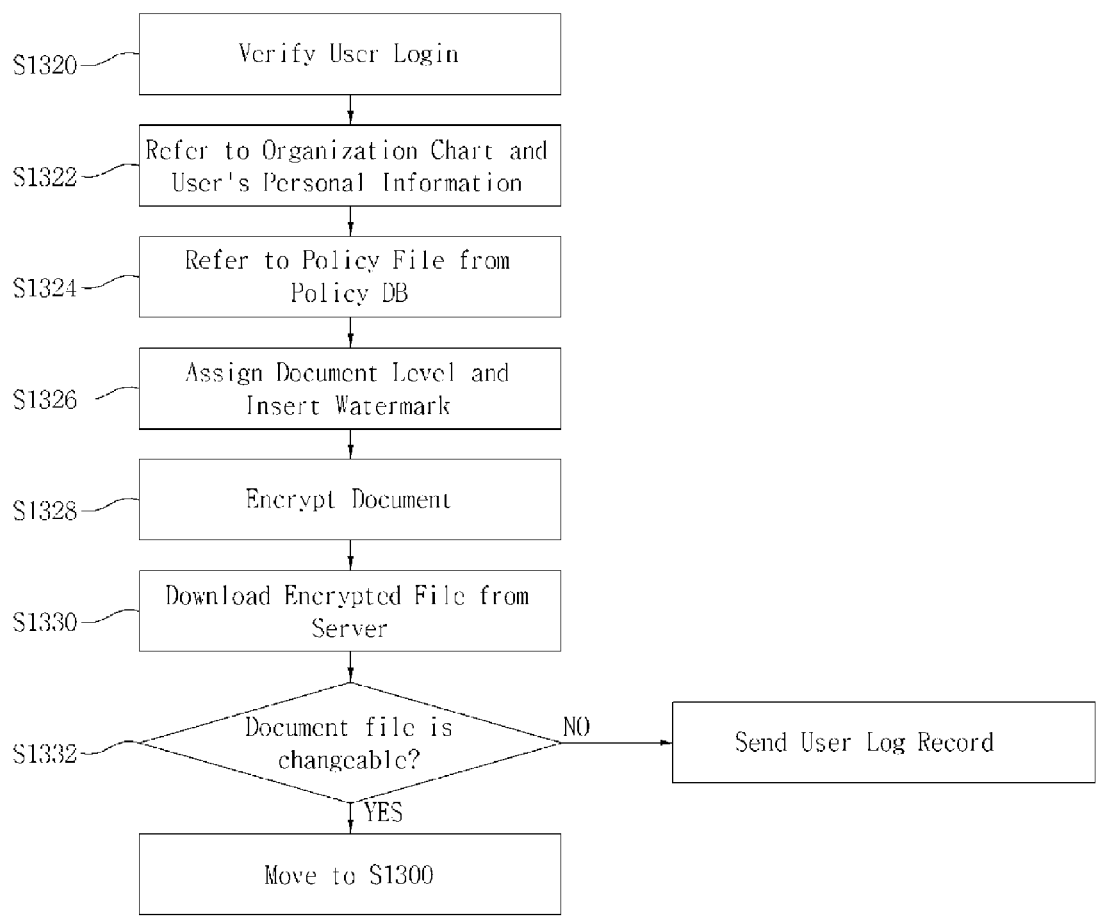
FIG. 13B illustrates a flow chart of a method for downloading a document with enhanced business information security from a server according to an embodiment of the present invention.

FIG. 13B illustrates a flow chart of a method for downloading an electronic document file with enhanced business information security from a server to the client device. First, in case there is a login request from the client device, the server verifies the login of the user at the client device (step S1320). The server also refers to an organization chart and the user's personal information from a personnel database (step S1322), and refers to the policy file including the document level set-up information and security policy from a policy database in the server (step S1324). The security management unit of the server assigns document level associated with user's accessibility to the electronic document file based on the document level set-up information, and watermark can be inserted to the electronic document file based on user's personal information (step S1326). The security management unit of the server encrypts the electronic document file after assigning the document level and inserting the watermark (step S1328). Then, the encrypted electronic document file can be sent from the server to the client device and downloaded by the client device according to the download request from the client device (step S1330). The client device that has downloaded with electronic document file from the server determines if it is possible to save the changes of the electronic document file according to the user's accessibility or create a new electronic document file, etc. (step S1332). If the electronic document file cannot be changed, user's log record is sent to the server, and if it is determined that it can be changed, it goes to step S1300, and an electronic document file with enhanced business information security can be created on the client device.

The method, device and system for creating an electronic document file on a client device with enhanced business security of the present invention made it possible to control accessibility to a document for each user and provide strong pre-security measures preventing the leakage of business information in advance by applying an appropriate security measure for each document, by searching whether an electronic document present in a company includes secret information of the company using a search technology for the electronic document, computing the exposure score based on the degree of exposure and determining the security level of the corresponding document, and controlling the user's accessibility to each security level of the document, i.e., supplementing the problems of DRM technique and DLP technique.

Also, it has become possible to track the leakage path when the document is leaked outside by the act of taking pictures, etc. by a third party, by inserting watermark to the document based on a specific value that can differentiate each user and providing differentiation to the document on the screen displayed for each user, and thus provide post-security measures to the company for the development of various micro devices.

In addition, the present invention has an advantage of providing a more efficient and enhanced business information security in the flow where the use of micro devices and mobile business environment, etc., is extending by allowing an electronic document file with enhanced business security to be created on the client device, not the server.

The present invention is explained with reference to preferable examples in the above. However, a person having ordinary skill in the art can variously modify and change the present invention within a scope that does not deviate from the idea and scope of the present invention described in the claims below.

INDUSTRIAL APPLICABILITY

According to the present invention, by searching whether an electronic document present in a company includes secret information of the company using a search technology for the electronic document, computing the exposure score based on the degree of exposure and determining the security level of the corresponding document, and controlling the user's accessibility to each security level of the document, it has become possible to control accessibility to a document for each user, and provide strong pre-security measures preventing the leakage of business information in advance by applying an appropriate security measure for each document.

Also, it has become possible to track the leakage path when the document is leaked outside by the act of taking pictures, etc. by a third party, by inserting watermark to the document based on a specific value that can differentiate each user and providing differentiation to the document on the screen displayed for each user, and thus provide post-security measures to the company for the development of various micro devices.

What is claimed is:

1. A method for creating an electronic document file on a client device to enhance business information security, the method comprising:
    monitoring creation of an electronic document file on a client device and changes on the electronic document file;
    receiving a policy file from a server, the policy file including regular expressions, keywords, security policy and document level set-up information, the document level set-up information including importance of words associated with business information, document level policy and user accessibility policy which defines a user's accessibility to a document according to a document level;
    retrieving a text data from the electronic document file;
    searching for words associated with business information from the retrieved text data;
    computing an exposure score, the exposure score indicating the sum of multiplying the number of times for words associated with business information being searched and the importance on words associated with business information;
    assigning a document level to the electronic document file based on the exposure score;
    receiving a user's personal information of the client device from the server and inserting a watermark to text of the electronic document file to be displayed on the client device based on the received user's personal information;
    based on the assigned document level to the electronic document file, performing a security processing according to the security policy, the security processing including one of deletion, isolation, encryption and notification; and
    creating a protected electronic document file by inserting an accessibility information into a header of the electronic document file.

2. The method of claim 1, wherein the inserting the watermark comprises varying at least one of a font size and a font width of the text according to the user's personal information.

3. The method of claim 1, further comprising downloading the electronic document file from the server to the client device, and wherein the downloading the electronic document file comprises:
    at the server, verifying a user login of the client device;
    referring to an organization chart and the user's personal information from a personnel database in the server;
    referring to the policy file including the security policy and the document level set-up information from a policy database in the server;
    assigning the document level associated with the user accessibility to the electronic document file based on the document level set-up information and inserting the watermark to the electronic document file based on the user's personal information;
    encrypting the electronic document file after the assigning the document level and the inserting the watermark; and
    sending the encrypted electronic document file from the server to the client device.

4. A system for enhancing business information security, the system comprising:
    a server comprising a processor and having a policy database and a personnel database; and
    a client comprising a processor, wherein the client is connected to the server via network and is configured to:
        monitor creation of an electronic document file and changes on the electronic document file;
        receive a policy file from the policy database in the server, the policy file including regular expressions, keywords, security policy and document level set-up information, the document level set-up information including importance of words associated with business information, document level policy and user accessibility policy which defines a user's accessibility to a document according to a document level;
        retrieve a text data from the electronic document file and search for words associated with business information from the retrieved text data;
        compute an exposure score and assign a document level to the electronic document file based on the exposure score, the exposure score indicating the sum of multiplying the number of times for words associated with business information being searched and the importance on words associated with business information;
        insert a watermark to text of the electronic document file to be displayed on the client based on a user's personal information received from the server;
        perform a security processing to the electronic document according to the security policy based on the assigned document level, the security processing including one of deletion, isolation, encryption and notification; and
        create a protected electronic document file by inserting an accessibility information into a header of the electronic document file.

5. The system of claim 4, wherein the client is further configured to vary at least one of a font size and a font width of the text according to the user's personal information.

6. The system of claim 4, wherein the server is configured to:
- verify a user login of the client;
- refer to an organization chart and the user's personal information from the personnel database;
- refer to the policy file including the security policy and the document level set-up information from the policy database;
- assign the document level associated with the user's accessibility to the electronic document file based on the document level set-up information and insert the watermark to the electronic document file based on the user's personal information; and
- encrypt the electronic document file after the assigning the document level and the inserting the watermark, and
- wherein the client is further configured to download the encrypted electronic document file from the server.

7. A client for creating an electronic document file to enhance business information security, wherein the client comprises a processor and is configured to:
- monitor creation of an electronic document file and changes on the electronic document file;
- receive a policy file from a server, the policy file including regular expressions, keywords, security policy and document level set-up information, the document level set-up information including importance of words associated with business information, document level policy and user accessibility policy which defines user's accessibility to a document according to a document level;
- retrieve a text data from the electronic document file;
- search for words associated with business information from the retrieved text data;
- compute an exposure score, the exposure score indicating the sum of multiplying the number of times for words associated with business information being searched and the importance on words associated with business information;
- assign a document level to the electronic document file based on the exposure score;
- receive a user's personal information of the client from the server and insert a watermark to text of the electronic document file to be displayed on the client based on the received user's personal information;
- perform a security processing according to the security policy based on the assigned document level, the security processing including one of deletion, isolation, encryption and notification; and
- create a protected electronic document file by inserting an accessibility information into a header of the electronic document file.

\* \* \* \* \*